(12) United States Patent
Yamamoto

(10) Patent No.: US 11,851,590 B2
(45) Date of Patent: Dec. 26, 2023

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventor: Katsuhiro Yamamoto, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/239,659

(22) Filed: Apr. 25, 2021

(65) Prior Publication Data

US 2021/0355354 A1    Nov. 18, 2021

(30) Foreign Application Priority Data

May 18, 2020   (KR) ......................... 10-2020-0059308

(51) Int. Cl.
| | | |
|---|---|---|
| *C09J 133/08* | (2006.01) | |
| *B32B 7/12* | (2006.01) | |
| *G06F 3/041* | (2006.01) | |

(52) U.S. Cl.
CPC ............... *C09J 133/08* (2013.01); *B32B 7/12* (2013.01); *B32B 2457/208* (2013.01); *G06F 3/0412* (2013.01)

(58) Field of Classification Search
CPC ........ C09J 133/08; C09J 4/06; C09J 151/003; C09J 133/24; B32B 7/12; B32B 2457/208; B32B 27/308; B32B 2255/26; B32B 2307/412; B32B 2307/748; B32B 27/26; B32B 2270/00; B32B 2457/206; G06F 3/0412; G06F 3/044; G06F 2203/04102; G06F 2203/04103; C08F 290/067; C08F 220/18; C08F 220/343; C08L 33/24; C08K 5/5397; G09F 9/30
See application file for complete search history.

(56) References Cited

U.S. PATENT DOCUMENTS

| | | | |
|---|---|---|---|
| 9,550,723 B2 | 1/2017 | Imada et al. | |
| 9,796,883 B2 * | 10/2017 | Katami | ....................... C09J 7/10 |
| 10,358,565 B2 | 7/2019 | Park et al. | |
| 2016/0362588 A1 * | 12/2016 | Moon | ................. H01L 51/5246 |
| 2019/0106599 A1 * | 4/2019 | Okamoto | .............. G02F 1/1335 |
| 2021/0238458 A1 * | 8/2021 | Asano | ..................... B32B 27/36 |

FOREIGN PATENT DOCUMENTS

| | | | | |
|---|---|---|---|---|
| CN | 102388324 A | * | 3/2012 | ............ C08F 220/00 |
| JP | 4513736 | | 7/2010 | |
| JP | 2012237965 | | 12/2012 | |
| JP | 5454749 | | 3/2014 | |
| JP | 2017210578 | | 11/2017 | |
| JP | 2019061323 | | 4/2019 | |

(Continued)

*Primary Examiner* — Tamra L. Dicus
(74) *Attorney, Agent, or Firm* — H.C. Park & Associates, PLC

(57) ABSTRACT

According to one aspect of the invention, a resin composition for use as an adhesive member in a display device includes: a first (meth)acrylic resin having a weight average molecular weight of about 10,000 to about 40,000; two or more second (meth)acrylic resins having a molecular weight of about 100 to about 250 and differing from one another; and two or more different photoinitiators.

13 Claims, 6 Drawing Sheets

(56) References Cited

FOREIGN PATENT DOCUMENTS

| KR | 100752968 | | 8/2007 | | |
|----|-----------|---|--------|---|---|
| KR | 101782217 | | 9/2017 | | |
| KR | 20180015221 A | * | 2/2018 | | |
| KR | 20190013760 | | 2/2019 | | |
| KR | 101955951 | | 3/2019 | | |
| KR | 20190022774 | | 3/2019 | | |
| WO | WO 2012121235 | * | 9/2012 | | |
| WO | WO-2015002269 A1 | * | 1/2015 | ............. | B32B 27/08 |
| WO | WO-2019017418 A1 | * | 1/2019 | ............. | C08G 59/18 |

* cited by examiner

RESIN COMPOSITION, ADHESIVE MEMBER, AND DISPLAY DEVICE INCLUDING THE SAME

CROSS-REFERENCE TO RELATED APPLICATIONS

This application claims priority from and the benefit of Korean Patent Application No. 10-2020-0059308, filed on May 18, 2020, which is hereby incorporated by reference for all purposes as if fully set forth herein.

BACKGROUND

Field

Exemplary implementations of the invention relate generally to a resin composition, and more particularly, to an adhesive member formed of the resin composition, and a display device including the adhesive member.

Discussion of the Background

Display body modules using a light emitting diode (LED), an organic electroluminescence (organic EL), etc. are used in various display devices. These display body modules are formed of a plurality of members, such as a plurality of optically functional films and protective panels, and for the purpose of improving adhesion, voids are avoided by bonding each layer by an optically clear adhesive film (OCA) or an optically clear adhesive resin (OCR).

Recently, members included in display devices have become diversified in shape, and may include recesses or voids in parts thereof. In addition, resin compositions used to form an adhesive layer in display devices of various shapes are required to have excellent coating properties for the members of display devices, which may have various shapes.

The above information disclosed in this Background section is only for understanding of the background of the inventive concepts, and, therefore, it may contain information that does not constitute prior art.

SUMMARY

A resin composition for use as an adhesive member in a display device made according to the principles and exemplary implementations of the invention exhibits excellent smoothness and substantially uniform applicability to an uneven surface. Accordingly, adhesive members prepared from such resin compositions are particularly advantageous when used to attach the layers of a display device. Display devices having one or more adhesive members including a polymer derived from a resin composition made according to the principles and exemplary implementations of the invention to have smoothness and substantially uniform applicability to an uneven surface, and exhibit excellent optical properties.

Additional features of the inventive concepts will be set forth in the description which follows, and in part will be apparent from the description, or may be learned by practice of the inventive concepts.

According to one aspect of the invention, a resin composition for use as an adhesive member in a display device includes: a first (meth)acrylic resin having a weight average molecular weight of about 10,000 to about 40,000; two or more second (meth)acrylic resins having a molecular weight of about 100 to about 250 and differing from one another; and two or more different photoinitiators.

The first (meth)acrylic resin may be included in an amount of about 2 wt % to about 10 wt % with respect to 100 wt % of the total amount of the first and second (meth)acrylic resins.

The first (meth)acrylic resin may include urethane (meth)acrylate.

The two or more second (meth)acrylic resins may include 4-hydroxybutyl acrylate, isodecyl acrylate, isobornyl acrylate, (2-2-ethyl-1,3-dioxolan-4-yl)methyl acrylate, 6-hydroxyhexyl acrylate, or 10-hydroxydecyl acrylate.

The two or more second (meth)acrylic resins may include 4-hydroxybutyl acrylate in an amount of about 60 wt % to about 80 wt %, and at least one of isodecyl acrylate or isobornyl acrylate in an amount of about 20 wt % to about 40 wt %, with respect to 100 wt % of the total amount of the second (meth)acrylic resins.

The first (meth)acrylic resin and the two or more second (meth)acrylic resins may have a weight ratio of about 5:95 to about 3:97.

The at least one of the two or more second (meth)acrylic resins may have a glass transition temperature of about −100° C. to about −30° C.

The photoinitiators may include at least one of a self-cleavage polymerization initiator or a hydrogen drawing polymerization initiator.

The self-cleavage polymerization initiator may include an acylphosphine oxide-based polymerization initiator.

The resin composition may have a viscosity at 25° C. of about 20 mPa·s to about 25 mPa·s, as measured according to the procedure JIS Z8803.

The resin composition may have a contact angle of about 10° to about 15° with respect to a slide glass.

According to another aspect of the invention, an adhesive member for a display device, the adhesive member including a polymer made from a resin composition, includes: a first (meth)acrylic resin having a weight average molecular weight of about 10,000 to about 40,000; two or more second (meth)acrylic resins having a molecular weight of about 100 to about 250 and differing from one another; and two or more different photoinitiators.

The first (meth)acrylic resin may be included in an amount of about 2 wt % to about 10 wt % with respect to 100 wt % of the total amount of the first and second (meth)acrylic resins.

The first (meth)acrylic resin may include urethane (meth)acrylate.

The two or more second (meth)acrylic resins may include 4-hydroxybutyl acrylate, isodecyl acrylate, isobornyl acrylate, (2-2-ethyl-1,3-dioxolan-4-yl)methyl acrylate, 6-hydroxyhexyl acrylate, or 10-hydroxydecyl acrylate.

At least one of the two or more second (meth)acrylic resins may have a glass transition temperature of about −100° C. to about −30° C.

The photoinitiators may include at least one of a self-cleavage polymerization initiator or a hydrogen drawing polymerization initiator.

The self-cleavage polymerization initiator may include an acylphosphine oxide-based polymerization initiator.

The adhesive member may have a peel strength of about 1.2 kg/inch to about 2.0 kg/inch with respect to glass.

According to a further aspect of the invention, a display device includes: a display panel; a window disposed on the display panel; and an adhesive member disposed between the display panel and the window, wherein the adhesive member includes a polymer made from a resin composition, and the resin composition includes: a first (meth)acrylic resin having a weight average molecular weight of about 10,000 to about 40,000; two or more second (meth)acrylic resins having a molecular weight of about 100 to about 250 and differing from one another; and two or more different photoinitiators.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
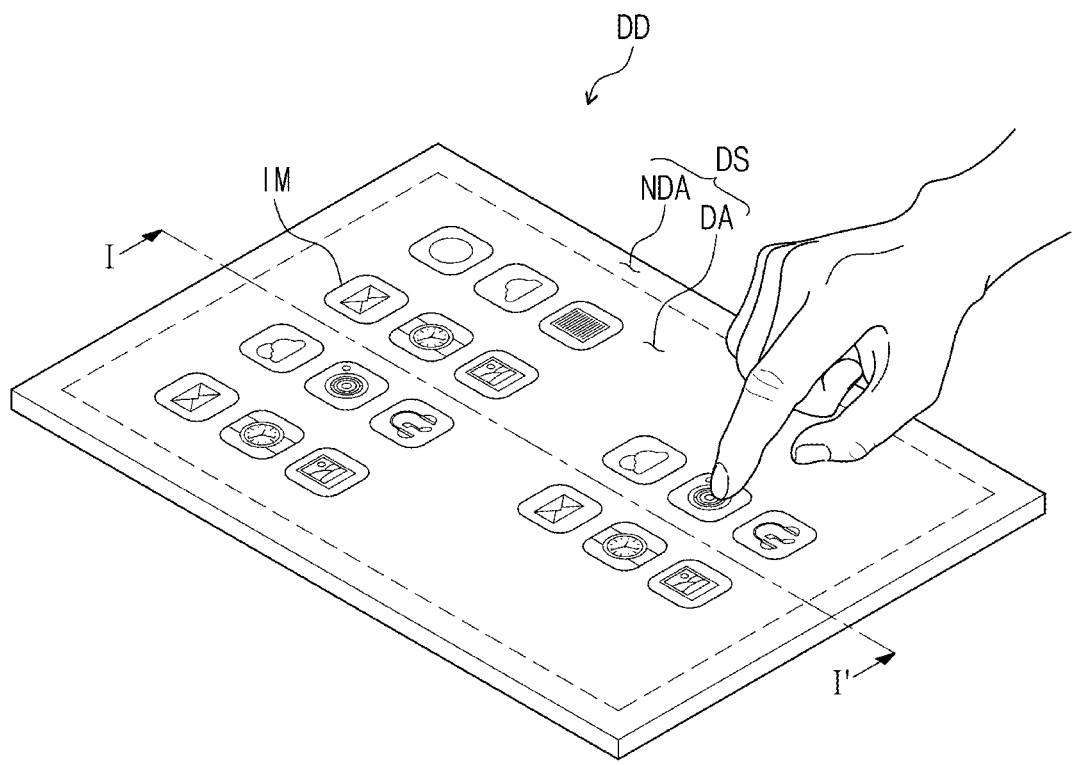
FIG. 1 is a perspective view illustrating an exemplary embodiment of a display device constructed according to principles of the invention.
Figure 1:
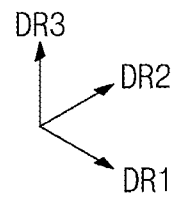

In the following description, for the purposes of explanation, numerous specific details are set forth in order to provide a thorough understanding of various exemplary embodiments or implementations of the invention. As used herein "embodiments",and "implementations",are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, portions, regions, plates, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on,","connected to,",or "coupled to",another element or layer, it may be directly on, connected to, or coupled to the other element or layer or intervening elements or layers may be present. When, however, an element or layer is referred to as being "directly on,","directly connected to,",or "directly coupled to", another element or layer, there are no intervening elements or layers present. The term "on",may include the case of being disposed on a lower part as well as an upper part.

To this end, the term "connected",may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z", and "at least one selected from the group consisting of X, Y, and Z",may be construed as X only, Y only, Z only, or any combination of two or more of X, Y, and Z, such as, for instance, XYZ, XYY, YZ, and ZZ. As used herein, the term "and/or", includes any and all combinations of one or more of the associated listed items.

Although the terms "first,","second,",etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath,","below,","under,","lower,","above,", "upper,","over,","higher,","side", (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below",or "beneath", other elements or features would then be oriented "above", the other elements or features. Thus, the exemplary term "below",can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a,","an,", and "the",are intended to include the plural forms as well, unless the context clearly indicates otherwise. Moreover, the terms "comprises,","comprising,","includes,",and/or "including,", when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially,","about,",and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, the term "(meth)acryloyl group",refers to an acryloyl group or a methacryloyl group, and the term "(meth)acrylic",refers to acrylic or methacryl.

FIG. 1 is a perspective view illustrating an exemplary embodiment of a display device constructed according to principles of the invention. Referring to FIG. 1, the display device DD may have a generally rectangular shape which has long sides extending in a first directional axis DR1 direction and short sides extending in a second directional axis DR2 direction which intersects the first directional axis DR1. However, the exemplary embodiments are not limited thereto. The display device DD may have various shapes such as generally circular and generally polygonal shapes. The display device DD may be a flexible display device.

In the display device DD, a display surface DS on which an image IM is displayed may be substantially parallel to a plane defined by the first directional axis DR1 and the second directional axis DR2. The normal direction of the display surface DS, that is, the thickness direction of the display device DD is indicated by a third directional axis DR3. A front surface (or an upper surface) and a rear surface (or a lower surface) of each member may be defined by the third directional axis DR3. However, the directions indicated by the first to third directional axes DR1, DR2, and DR3 are relative concepts, and may thus be changed to other directions. Hereinafter, first to third directions correspond to directions indicated by the first to third directional axes DR1, DR2, DR3, respectively, and are given the same reference numerals.

The display surface DS of the display device DD may include a display area DA and a non-display area NDA around the display area DA. The display area DA may display an image, and the non-display area NDA may not display an image. The non-display area NDA may surround the display area DA, and define the edge of the display device DD.

Figure 2:
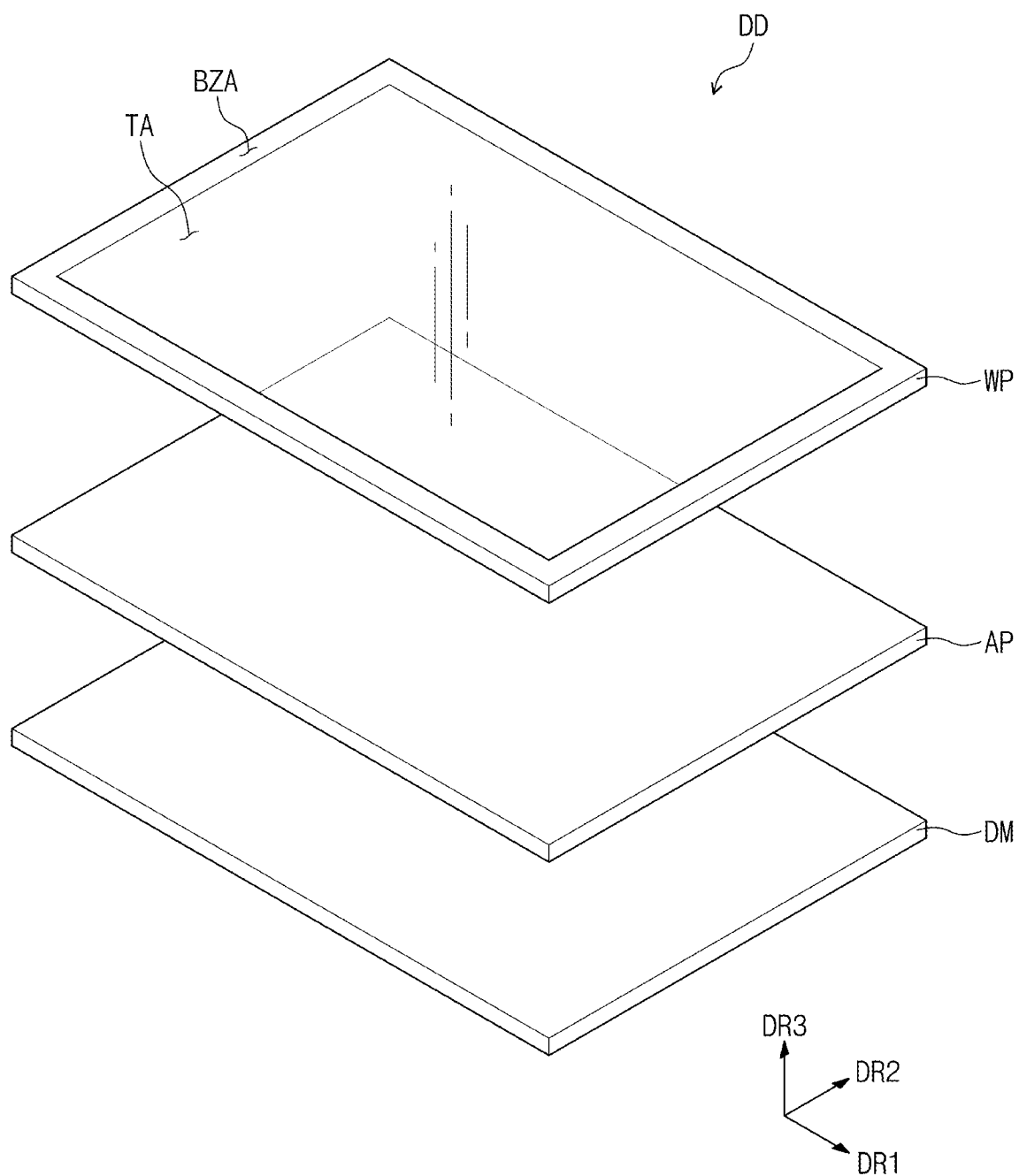
FIG. 2 is an exploded perspective view of the display device of FIG. 1.
Figure 3:
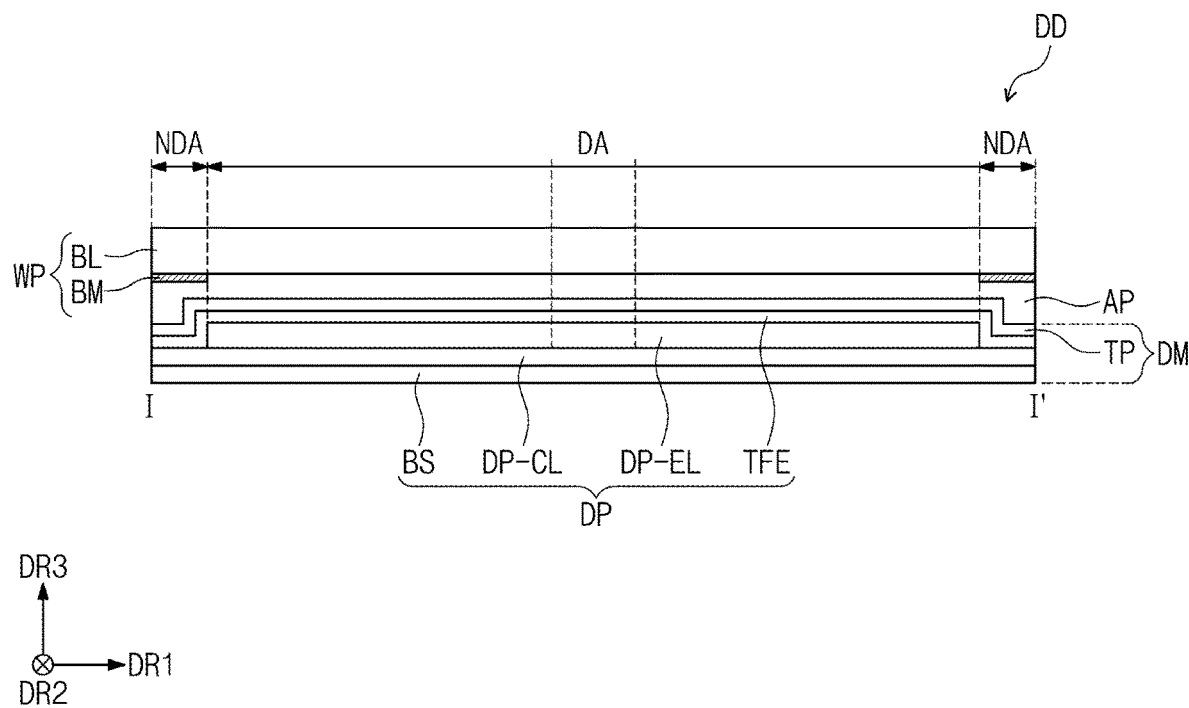
FIG. 3 is a cross-sectional view of the display device taken along lines I-I', of FIG. 1.

FIG. 2 is an exploded perspective view of the display device of FIG. 1. FIG. 3 is a cross-sectional view of the display device taken along lines I-I',of FIG. 1.

Referring to FIGS. 2 and 3, the display device DD may include a display module DM, and a window WP disposed on the display module DM. In the display device DD, the display module DM may include a display panel DP having a display element layer DP-EL, and an input sensing unit TP disposed on the display panel DP. The display device DD may include an adhesive member AP disposed between the display panel DP and the window WP. The adhesive member AP may be an optically clear adhesive film (OCA) or an optically clear adhesive resin (OCR). The display device DD may include the input sensing unit TP, and the adhesive member AP may be disposed between the input sensing unit TP and the window WP.

The adhesive member AP may be formed from a resin composition RC. According to one or more exemplary embodiments, the resin composition RC may include a first (meth)acrylic resin containing at least one (meth)acryloyl group and having a weight average molecular weight Mw of about 10,000 to about 40,000, two or more second (meth)acrylic resins containing at least one (meth)acryloyl group, having a molecular weight of about 100 to about 250, and differing from one another, and two or more photoinitiators differing from one another.

In the resin composition RC of some exemplary embodiments, the first (meth)acrylic resin having a weight average molecular weight of about 10,000 to about 40,000 may include at least one acryloyl group or at least one methacryloyl group. For example, the first (meth)acrylic resin may be an acrylate resin or a methacrylate resin including one acryloyl group or one methacryloyl group. When the first (meth)acrylic resin has a weight average molecular weight of less than about 10,000, sufficient adhesive strength for practical use may hardly be achieved, and because the flow of the resin composition (RC) occurs due to low viscosity, a coating film having a substantially uniform thickness may not be formed. In addition, when the first (meth)acrylic resin has a weight average molecular weight of greater than about 40,000, the viscosity increases, making it unsuitable for forming a coating layer using an inkjet printing method.

The resin composition RC of some exemplary embodiments may include the first (meth)acrylic resin in an amount of about 2 wt % to about 10 wt %, with respect to 100 wt % of the total amount of the (meth)acrylic resin. The total amount of the (meth)acrylic resin corresponds to all of the first (meth)acrylic resin, the second (meth)acrylic resins, and the photoinitiators. When the first (meth)acrylic resin is included in an amount of less than about 2 wt %, sufficient adhesive strength for practical use may be hardly achieved, and since the viscosity decreases, the flow of the resin composition RC occurs, and thus a coating film having substantially uniform thickness may not be formed. In addition, when the first (meth)acrylic resin is included in an amount of greater than about 10 wt %, the viscosity and the contact angle may increase, and thus the smoothness of the adhesive member AP formed of the resin composition RC may decrease.

In some exemplary embodiments, the first (meth)acrylic resin may include urethane (meth)acrylate. The first (meth) acrylic resin may include acrylate containing at least one urethane group. For example, the first (meth)acrylic resin may be a urethane acrylate resin or a urethane methacrylate resin. For example, the resin composition may be a urethane (meth)acrylate resin having a weight average molecular weight of about 10,000 to about 40,000, and may include at least one of the following sold under the trade designation: UV-3700B, UV-3524ACMO, UV-3310B, and UV-3521ACMO all by Mitsubishi Chemical Co., Ltd. of,Tokyo, Japan; and UA10000B by KSM Electronics Co., of Tamarac, FL; UA-2374PIB by Shin-Nakamura Chemical Co., Ltd. of Wakayama, Japan.

The resin composition may include two or more second (meth)acrylic resins having a molecular weight of about 100 to about 250 and differing from one another. Two or more second (meth)acrylic resins differing from one another each may include different types of (meth)acrylic resins. For example, in the resin composition of some exemplary embodiments, the second (meth)acrylic resins may include different types of second (meth)acrylic resins, or the same type of second (meth)acrylic resins having different molecular weights. Specifically, in the resin composition of some exemplary embodiments, the second (meth)acrylic resin may include at least one acrylate resin and at least one methacrylate resin.

The second (meth)acrylic resin may include a first sub (meth)acrylic resin and a second sub (meth)acrylic resin having different molecular weights. The second sub (meth) acrylic resin may have a greater average molecular weight than the first sub (meth)acrylic resin. For example, the first sub (meth)acrylic resin may be 4-hydroxybutyl acrylate, and the second (meth)acrylic resins may be 4-hydroxybutyl acrylate, isodecyl acrylate, isobornyl acrylate, (2-2-ethyl-1, 3-dioxolan-4-yl)methyl acrylate, 6-hydroxyhexyl acrylate, or 10-hydroxydecyl acrylate. However, this is merely an example, the number of sub (meth)acrylic resins included in the second (meth)acrylic resin is not limited, and the second (meth)acrylic resins may include two or more sub (meth) acrylic resins differing from one another.

In the case of the resin composition RC in which the molecular weight of each of the second (meth)acrylic resins is greater than about 250, when used to form an adhesive member AP, the peel strength for a substrate decreases, and thus the ability to function as the adhesive member AP may be degraded. In addition, when the molecular weight of each of the second (meth)acrylic resins is less than about 100, the flow of the resin composition RC may occur due to the low viscosity, thus causing difficulties in forming a coating film having a substantially uniform thickness.

In the resin composition of some exemplary embodiments, the second (meth)acrylic resin having a molecular weight of about 100 to about 250 may include at least one among hydroxy group-containing (meth)acrylate, aromatic (meth)acrylate, alkyl (meth)acrylate, and alicyclic (meth) acrylate.

In the resin composition RC of some exemplary embodiments, the second (meth)acrylic resins may include two or more selected among 4-hydroxybutyl acrylate, isodecyl acrylate, isobornyl acrylate, (2-2-ethyl-1,3-dioxolane-4-yl) methyl acrylate, 6-hydroxyhexyl acrylate, and 10-hydroxydecyl acrylate. For example, the second (meth)acrylic resin included in the resin composition RC may include two or more materials sold under the trade designation 4-HBA, IDAA, and IBXA all by Osaka Organic Chemical Industry Co., Ltd. of Osaka City, Japan.

In the resin composition RC of some exemplary embodiments, each of the second (meth)acrylic resins may have a glass transition temperature (Tg) of about −100° C. to about −30° C. When the glass transition temperature is greater than about −30° C., the peel strength for a substrate becomes small, and thus the ability to function as an adhesive member AP may be degraded, and when the glass transition temperature of the second (meth)acrylic resins is less than about −100° C., softening is overperformed at room temperature, causing difficulties in obtaining sufficient adhesive strength for practical use.

In the resin composition of some exemplary embodiments, the amount of the first sub (meth)acrylic resin may be greater than that of the second sub (meth)acrylic resin. For example, the second (meth)acrylic resin may include 4-hydroxybutyl acrylate in an amount of about 60 wt % to about 80 wt %, and at least one of isodecyl acrylate or isobornyl acrylate in an amount of about 20 wt % to about 40 wt %, with respect to 100 wt % of the total amount of the second (meth)acrylic resin.

In the resin composition RC of some exemplary embodiments, the amount of the second (meth)acrylic resin may be greater than the amount of the first (meth)acrylic resin. The weight ratio of the first (meth)acrylic resin to the second (meth)acrylic resin out of the whole resin composition RC may be about 5:95 to about 3:97.

The resin composition RC may have a viscosity at 25° C. of about 20 mPa·s to about 25 mPa·s, as measured according to the procedure JIS K 2283 (2011). When the resin composition RC has a viscosity of less than 20 mPa·s, the viscosity is low, resulting in a flow of the resin composition RC provided for forming an adhesive member AP, and accordingly, it may be difficult to form a coating film having a substantially uniform thickness. In addition, when the resin composition RC has a viscosity of greater than about 25 mPa·s, it may be difficult for the resin composition RC to be discharged in an appropriate amount from an applicator used to apply the resin composition RC.

The resin composition RC may have a contact angle of about 10° to about 15°, with respect to glass. The contact angle was measured by a θ/2 method at room temperature using a contact angle meter sold under the trade designation DM-601 by Kyowa Interface Science Co., Ltd., of Niiza, Japan with respect to slide glass sold under the trade designation S1112 by Matsunami Glass Ind., Ltd of Osaka, Japan. When the contact angle is less than about 10°, the affinity with a substrate increases, the flow of the resin composition RC occurs, thus causing difficulties in forming a substantially uniform coating layer. In addition, when the contact angle is greater than about 15°, the affinity with a substrate decreases, and the smoothness of an adhesive member AP formed from the resin composition decreases.

The resin composition RC may include two or more different photoinitiators. For example, different photoinitiators may be activated by ultraviolet light having different central wavelengths. However, the exemplary embodiments are not limited thereto.

The photoinitiators may include at least one of a self-cleavage type of photoinitiator or a hydrogen drawing type of photoinitiator. The self-cleavage type photoinitiator included in the resin composition RC may be an acylphosphine oxide-based polymerization initiator.

At least two types of photoinitiators may be selected among 2,2-dimethoxy-1,2-diphenylethan-1-one, 1-hydroxycyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

In addition, at least two types of photoinitiators may be selected among 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methylbenzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino], acetate), and bis(2,4-cyclopentadienyl)bis[2,6-difluoro-3-(1-pyrryl)phenyl], titanium(IV).

The resin composition RC may be cured by ultraviolet irradiation. The liquid resin composition RC may be cured by ultraviolet irradiation to form an adhesive member A. For example, the adhesive member AP may be formed in the form of a film or thin film.

Referring back to FIG. 3, the display panel DP may include a base substrate BS, a circuit layer DP-CL disposed on the base substrate BS, and a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL.

The configuration of the display panel DP shown in FIG. 3 is an example and the configuration of the display panel DP is not limited to the one shown in FIG. 3. For example, the display panel DP may include a liquid crystal display element, and in this case, the encapsulation layer TFE may be omitted.

An input sensing unit TP may be disposed on the display panel DP. For example, the input sensing unit TP may be directly disposed on the encapsulation layer TFE of the display panel DP. The input sensing unit TP may detect an external input to convert the input into a predetermined input signal, and provide the input signal to the display panel DP. For example, in the display device DD, the input sensing unit TP may be a touch sensing unit sensing a touch. The input sensing unit TP may recognize a user's direct touch, a user's indirect touch, a direct touch of an object, or an indirect touch of an object. The input sensing unit TP may sense at least any one of the location of a touch or magnitude (pressure) of a touch applied from the outside. The input sensing unit TP may have various structures or be formed of various materials, and is not limited to any one specific configuration. The input sensing unit TP may include a plurality of sensing electrodes for sensing an external input. The sensing electrodes may sense an external input in a capacitive manner. The display panel DP may receive an input signal from the input sensing unit TP and generate an image corresponding to the input signal.

The window WP may protect the display panel DP and the input sensing unit TP. An image IM generated from the display panel DP may be provided to a user by being transmitted through the window WP. The window WP may provide a touch surface of the display device DD. In the display device DD including a folding area FA, the window WP may be a flexible window.

The window WP may include a base layer BL and a printing layer BM. The window WP may include a transmission area TA and a bezel area BZA. The front surface of the window WP including the transmission area TA and the bezel area BZA corresponds to the front surface of the display device DD.

The transmission area TA may be an optically transparent area. The bezel area BZA may be an area having a relatively lower light transmittance than the transmission area TA. The bezel area BZA may have a predetermined color. The bezel area BZA may be adjacent to the transmission area TA and surround the transmission area TA. The bezel area BZA may define the shape of the transmission area TA. However, the exemplary embodiments are not limited to the one illustrated, the bezel area BZA may be disposed adjacent to only one side of the transmission area TA, and a part thereof may be omitted.

The base layer BL may be a glass or a plastic substrate. For example, the base layer BL may be a tempered glass substrate. Alternatively, the base layer BL may be formed of a flexible polymer resin. For example, the base layer BL may be formed of a polyimide, a polyacrylate, a polymethylmethacrylate, a polycarbonate, a polyethylenenaphthalate, a polyvinylidene chloride, a polyvinylidene difluoride, a polystyrene, an ethylene vinylalcohol copolymer, or combinations thereof. However, the exemplary embodiments are not limited thereto, and a general form known as the base layer BL of the window WP in the art may be used without limitation The printing layer BM may be disposed on one surface of the base layer BL. In some exemplary embodiments, the printing layer BM may be provided on a lower surface of the base layer BL adjacent to the display panel DP. The printing layer BM may be disposed on an edge area of the base layer BL. The printing layer BM may be an ink printing layer. Further, the printing layer BM may be a layer formed by including a pigment or a dye. In the window WP, the bezel area BZA may be a portion in which the printed layer BM is provided.

The window WP may further include at least one functional layer provided on the base layer BL. For example, the functional layer may be a hard coating layer, an anti-fingerprint coating layer, etc., but the exemplary embodiments are not limited thereto.

There may be a step between the portion provided with the printing layer BM and the base layer BL without the printing layer BM. An adhesive member AP formed from exemplary embodiments of the resin composition RC described above has high adhesion to be attached to the window WP without lifting at the step portion, and has high smoothness without a curl to increase the transmission amount of light, and may thus improve the optical properties of the display device DD.

The adhesive member AP may include a polymer derived from the resin composition RC described above. That is, the adhesive member AP may include a polymer derived from the resin composition RC containing a first (meth)acrylic resin having a weight average molecular weight of about 10,000 to about 40,000, two or more second (meth)acrylic resins having a molecular weight of about 100 to about 250 and differing from one another, and two or more different photoinitiators. In the resin composition used to form the adhesive member of some exemplary embodiments, for the first (meth)acrylic resin, the second (meth)acrylic resin, and the photoinitiator, the same descriptions of the resin composition RC described above may be applied.

The adhesive member AP included in the display device DD is provided on one surface of the window WP or one surface of the display module DM in a liquid resin composition RC state, and may be formed by ultraviolet-curing the liquid resin composition RC provided between the window WP and the display panel DP. Unlike the exemplary embodiment above, the adhesive member AP may be provided by ultraviolet-curing the liquid resin composition RC in a separate process, laminating one surface of the adhesive member AP in a cured state in the form of an adhesive film on one surface of the window WP or one surface of the display module DM, and attaching one surface of the window WP or one surface of the display module DM, which is unattached, to the other surface of the adhesive member AP.

Figure 4A:
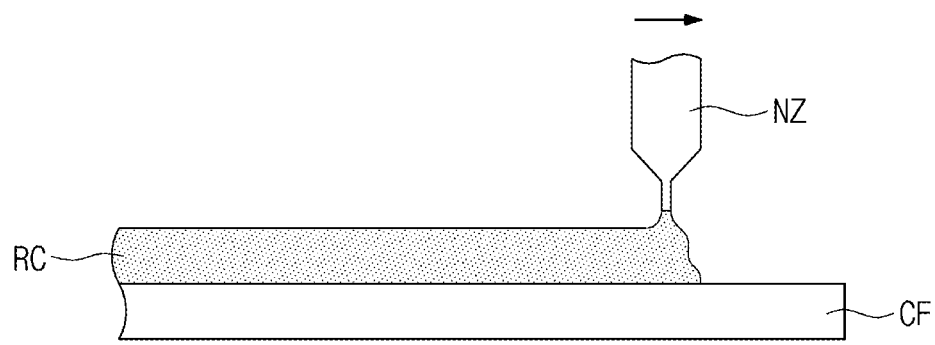
FIGS. 4A to 4C are cross-sectional views illustrating an exemplary embodiment of a method for manufacturing an adhesive member according to principles of the invention.
Figure 4B:
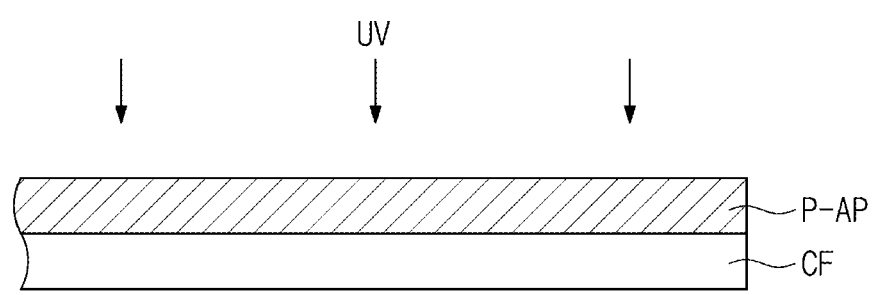
Figure 4C:
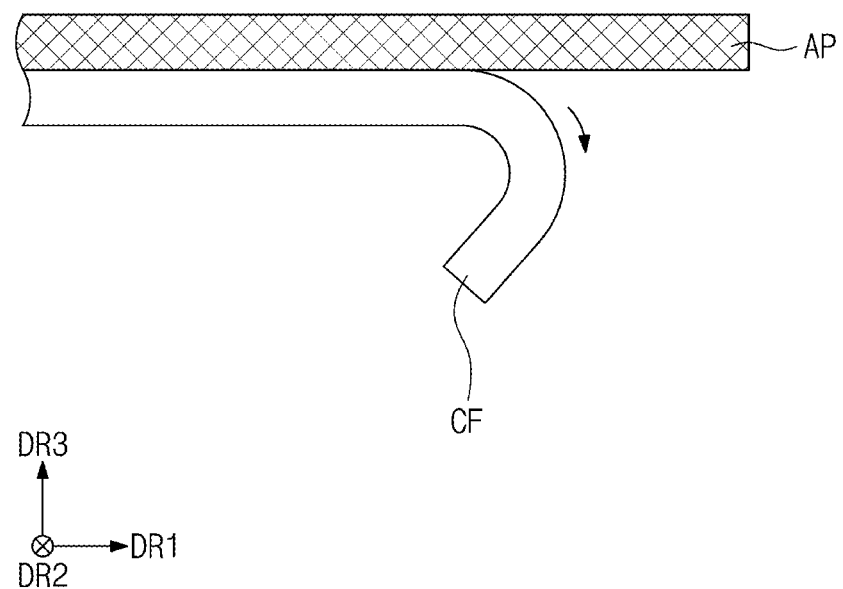

FIGS. 4A to 4C are cross-sectional views illustrating an exemplary embodiment of a method for manufacturing an adhesive member according to principles of the invention. FIG. 4A illustrates a step of providing a resin composition RC for forming an adhesive member AP, FIG. 4B illustrates a step of UV irradiation, and FIG. 4C illustrates a step of removing a carrier film CF.

Referring to FIGS. 4A to 4C, the resin composition RC may be provided on the carrier film CF. For example, a polyethylene terephthalate (PET) film may be used as the carrier film CF, but the exemplary embodiments are not limited thereto. The carrier film CF serves as a substrate for coating the liquid resin composition RC, and may be used without limitation as long as it is easily detached from the adhesive member AP after ultraviolet-curing. For example, release treatment may be performed on one surface of the carrier film CF provided with the resin composition RC.

The resin composition RC may be provided by methods such as an inkjet printing method or a dispensing method. The resin composition RC may be easily discharged from a nozzle NZ, etc. by having a viscosity value of about 20 mPa·s to about 25 mPa·s at 25° C., and may be provided to maintain a constant coating thickness. A pre-adhesive member P-AP provided by coating the resin composition RC to a constant thickness may be irradiated with ultraviolet light (UV).

FIG. 4B illustrates that the coated pre-adhesive member P-AP is directly irradiated with the ultraviolet light (UV), but the exemplary embodiments are not limited thereto. An auxiliary carrier film may be further disposed on the pre-adhesive member P-AP, and the auxiliary carrier film transmits ultraviolet light and may cover the pre-adhesive member P-AP during the ultraviolet-curing process.

After ultraviolet-curing, an adhesive member AP may be formed. The adhesive member AP may finally be formed by removing the carrier film CF used in the process. The adhesive member AP prepared in the steps of FIGS. 4A to 4C may be applied to the display device DD described above. For example, one surface of the adhesive member AP is attached on the display module DM, and then the window WP may be sequentially attached on the other surface of the adhesive member AP facing one surface of the adhesive member AP attached to the display module DM. In addition, unlike the one described above, the adhesive member AP may be provided in the display device DD by attaching one surface of the adhesive member AP on one surface of the window WP to face the display module DM, and then attaching the other surface of the adhesive member AP facing one surface of the adhesive member AP attached to the window WP to the display module DM. The resin composition RC provided in a liquid state between the display module DM and the window WP may be cured to form an adhesive member AP.

Figure 5A:
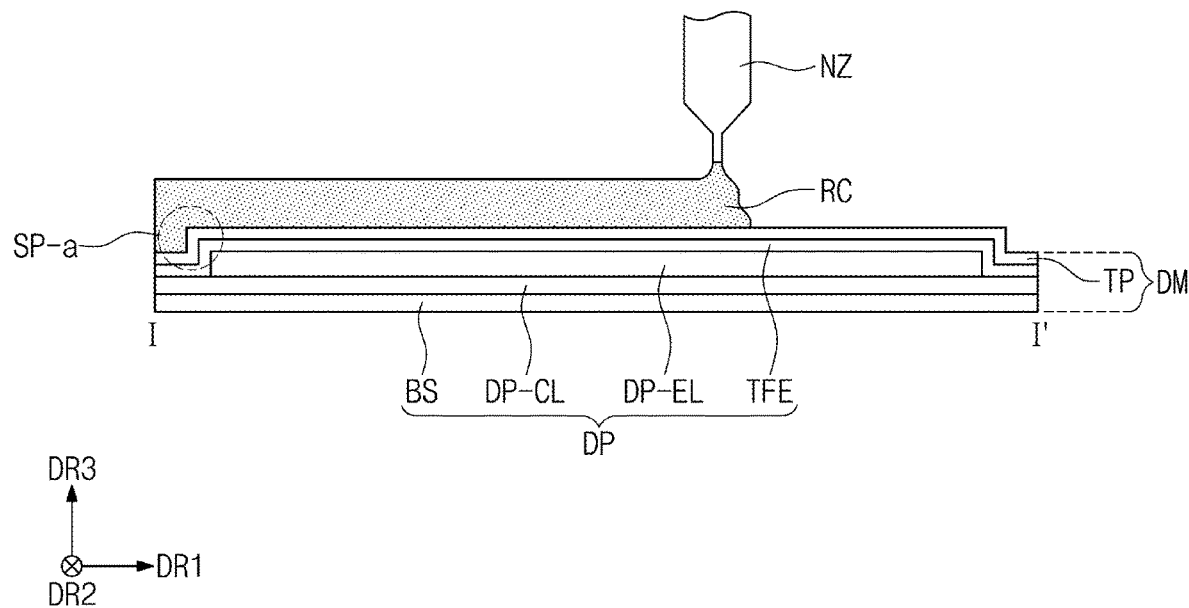
FIGS. 5A and 5B are cross-sectional views illustrating another exemplary embodiment of a method for manufacturing an adhesive member according to principles of the invention.
Figure 5B:
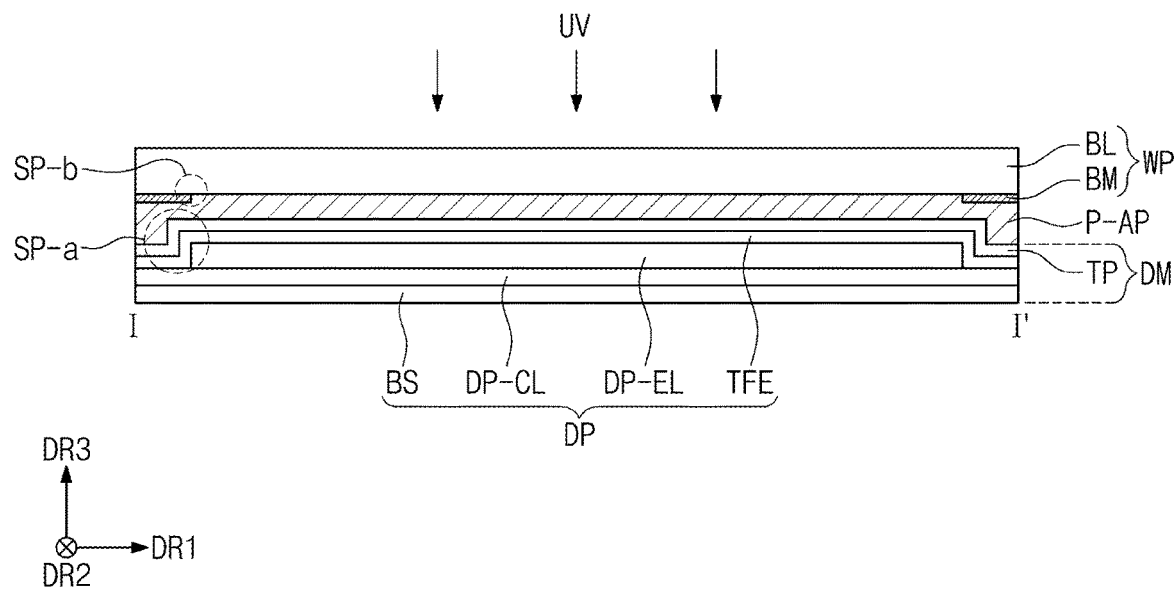

FIGS. 5A and 5B are cross-sectional views illustrating another exemplary embodiment of a method for manufacturing an adhesive member according to principles of the invention.

FIGS. 5A and 5B illustrate steps of preparing an adhesive member AP included in the display device DD by a method different from the method for preparing the adhesive member AP described with reference to FIGS. 4A to 4C.

The resin composition RC may be provided by methods such as an inkjet printing method or a dispensing method. The resin composition RC may be easily discharged from a nozzle NZ, etc. by having a viscosity value of about 20 mPa·s to about 25 mPa·s at 25° C., and may be provided to maintain a thin, constant coating thickness.

The resin composition RC may have a low viscosity value of about 25 mPa·s or less, and may thus be easily discharged from the nozzle NZ. In addition, the resin composition RC provided through the nozzle NZ may have a viscosity value of about 20 mPa·s or greater to be substantially uniformly coated to a predetermined thickness with no empty space in an uneven portion such as a step portion SP-a without flowing out of the display module DM.

The resin composition RC may have a contact angle of about 10° to about 15°. The resin composition RC having such a property may adhere to a substrate to be coated after being discharged from the nozzle NZ, etc. In some exemplary embodiments, the resin composition RC has a contact angle of about 10° to about 15°, and accordingly, the resin composition RC may form a substantially uniform coating layer in an uneven portion such as a step portion SP-a without flowing out of the display module DM. In addition, the resin composition RC may have a contact angle of about 10° to about 15° to form an adhesive member AP having excellent smoothness. In addition, the display device DD including the adhesive member AP having excellent smoothness may exhibit excellent optical properties. The optical properties may be excellent light transmittance.

Unlike shown in FIG. 4B, before the window WP is provided on the pre-adhesive member P-AP, ultraviolet light (UV) radiation is incident upon the pre-adhesive member P-AP to perform polymerization reaction in the resin composition RC. The amount of ultraviolet light (UV) irradiation may be an amount of light that serves to substantially fully cure the resin composition RC. However, unlike the one described above, the final adhesive member AP may be formed by partially performing the polymerization reaction of the resin composition RC in the pre-adhesive member P-AP state, and then further reacting an unreacted resin composition RC after covering the window WP.

Hereinafter, with reference to Examples and Comparative Examples, a resin composition, an adhesive member, and a display device made according to one or more exemplary embodiments of the invention and comparative examples will be specifically described. In addition, the examples shown below are for illustration only, and do not limit the scope of the invention.

EXAMPLE

1. Resin Composition Preparation

Based on the amounts described in Tables 1 and 2, a first (meth)acrylic resin, a second (meth)acrylic resin, and a photoinitiator were put into a light-shielding poly container and mixed. With respect to 100 wt % of the total amount of the mixed acrylic resin, 2 wt % of an initiator sold under trade designation Ominirad TPO-H, Esacure 3644, Photomer 4250, and Ominirad 819 by IGM Resins BV of Waalwijk, Netherlands were mixed in a weight ratio of 60:10:1:30 was added to the light-shielding poly container. A curable resin composition was obtained by stirring at 100 rpm for 1 hour at room temperature using a three-one motor by Shinto Science Co., Ltd. of Tokyo, Japan.

2. Contact Angle Measurement Method

The blended curable resin composition was added drop-wise onto slide glass (Matsunami Glass Ind., Ltd, slide glass trade designation S1112), and the contact angle was measured by a θ/2 method at room temperature using a contact angle meter (Kyowa Interface Science Co., Ltd., trade designation DM-601). The contact angle was taken as the average value of five measurements.

3. Viscosity Measurement Method

Viscosity was measured at 25° C. and 10 rpm by according to the procedure JIS Z8803 (2011) using a viscometer sold under the trade designation TVE-25L by Toki Sangyo, Co., Ltd of Tokyo, Japan.

4. Peel Strength Evaluation Method 0.6 mL of the resin composition prepared by the preparation method described above was added dropwise onto slide glass (Matsunami Glass Ind., Ltd, slide glass trade designation S1112), and a 100 μm polyethylene terephthalate (PET) film sold under the trade designation A4100 by Toyobo, Osaka, Japan was attached. While being attached, the resin composition was cured through irradiation of 5,000 mJ/cm$^2$ of ultraviolet light using a metal halide lamp (Eye Graphics Co., Ltd., of Tokyo, Japan conveyor type UV irradiation device) on the glass side. The peel strength was measured using a universal material tester sold under the trade designation 5965 by Instron, of Norwood, Massachusetts such that the prepared specimen had a peel angle of 180° at a rate of 300 mm/min. The peel strength was taken as the average value of the force required to remove about 50 mm of an adhesive member AP formed by curing the resin composition from the glass. The peel strength was evaluated as "pass",when the value was 1 kg/(2.54 cm or inch) or greater, and "fail",when the value was less than 1 kg/(2.54 cm or inch).

5. Coating Property Evaluation Method

The blended resin composition was applied to a glass substrate with a hole having a diameter of 5 mm to form a hole having a diameter of 5.2 mm using an inkjet device sold under the trade designation Device Printer-CX by Microjet Technology Co., Ltd of Hsinchu, Taiwan. Thereafter, the diameter of the hole formed in the resin composition was measured using a digital microscope sold under trade designation DSX1000 by Olympus, Corporation of Tokyo, Japan. The coating shape properties were evaluated as "fail",when the diameter of the hole formed in the resin composition was less than 5.1 mm or greater than 5.2 mm, and "pass",when the diameter of the hole formed in the resin composition was 5.1 mm to 5.2 mm. When failing the injection of the resin composition in the inkjet device, "–" was described and numerical values were not indicated.

6. Smoothness Evaluation Method

The blended resin composition was applied to a glass substrate with a hole having a diameter of 5 mm to form a hole having a diameter of 5.2 mm using an inkjet device (Microjet, trade designation Device Printer-CX). Thereafter, the resin composition was cured through irradiation of 200 mJ/cm$^2$ of ultraviolet light using an LED-UV irradiation device (CCS, HLDL peak wavelength 385 nm), the glass plate was bonded using a 2 kg-load roller, and the resin composition was cured through irradiation of 5000 mJ/cm$^2$ of ultraviolet light using a metal halide lamp (Eye Graphics Co., Ltd. of Tokyo, Japan, conveyor type UV irradiation device) on the glass plate to obtain a sample. The obtained sample was observed with the naked eye to evaluate smoothness. When no abnormality in smoothness was observed with the naked eye, "O", was indicated. Failing the injection of the resin composition in the inkjet device is designated as, "–".

Tables 1 and 2 below show the evaluation results of contact angles, viscosity, peel strength, coating properties, smoothness, etc. for Examples 1 to 4 and Comparative Examples 1 to 5. Table 1 shows the composition and evaluation results of the resin compositions for Examples 1 to 4, and Table 2 shows the composition and evaluation results of the resin compositions for Comparative Examples 1 to 5. The results summarized below show that the characteristics of the Example Embodiments of the invention are significantly and unexpectedly better than the Comparative Examples.

TABLE 1

|  | Material | Molecular Weight | Tg | Example 1 | Example 2 | Example 3 | Example 4 |
|---|---|---|---|---|---|---|---|
| First (meth)acrylic resin | A1 | 38000 | — | 5 | | | |
|  | A2 | 25000 | — | | 5 | | |
|  | A3 | 16000 | — | | | 5 | |
|  | A4 | 14000 | — | | | | 3 |
|  | A5 | 6000 | — | | | | |
| Second (meth)acrylic resin | B1 | 144 | −32 | 70 | 60 | 80 | 72 |
|  | B2 | 212 | −62 | 25 | | 15 | 25 |
|  | B3 | 200 | 27 | | | | |
|  | B4 | 324 | −18 | | | | |
|  | B5 | 208 | 94 | | 35 | | |
| Contact angle (°) | | | | 10 | 12 | 15 | 13 |
| Viscosity (mPa · s) | | | | 20 | 22 | 25 | 25 |
| Peel strength (kg/inch) | | | | 1.2 | 2 | 1.6 | 1.5 |
| Coating property (mm) | | | | 5.1 | 5.1 | 5.2 | 5.1 |
| Smoothness | | | | O | O | O | O |

TABLE 2

|  | Material | molecular weight | Tg | Comparative (C.) Example (Ex.) 1 | C. Ex. 2 | C. Ex. 3 | C. Ex. 4 | C. Ex. 5 |
|---|---|---|---|---|---|---|---|---|
| First (meth)acrylic resin | A1 | 38000 | — | 12 | | | 5 | 10 |
|  | A2 | 25000 | — | | 20 | | | |
|  | A3 | 16000 | — | | | | | |
|  | A4 | 14000 | — | | | 10 | | |
|  | A5 | 6000 | — | | | | | 10 |

TABLE 2-continued

|  | Material | molecular weight | Tg | Comparative (C.) Example (Ex.) 1 | C. Ex. 2 | C. Ex. 3 | C. Ex. 4 | C. Ex. 5 |
|---|---|---|---|---|---|---|---|---|
| Second (meth)acrylic resin | B1 | 144 | −32 |  | 40 | 45 |  |  |
|  | B2 | 212 | −62 |  | 20 |  |  |  |
|  | B3 | 200 | 27 | 88 |  |  | 95 |  |
|  | B4 | 324 | −18 |  |  |  |  | 90 |
|  | B5 | 208 | 94 |  | 20 | 45 |  |  |
| Contact angle (°) |  |  |  | 30 | 40 | 9 | 15 | 15 |
| Viscosity (mPa · s) |  |  |  | 70 | 140 | 13 | 25 | 25 |
| Peel strength (kg/inch) |  |  |  | 2.3 | 1.2 | 0.5 | 0.1 | 0.3 |
| Coating property (mm) |  |  |  | — | — | 5.0 | 5.1 | 5.1 |
| Smoothness |  |  |  | — |  |  |  |  |

The types of the first and second (meth)acrylic resins used in Tables 1 and 2 are as follows.

First (Meth)Acrylic Resin

A1: UV-3700B, Mitsubishi Chemical Co., Ltd., urethane acrylate

A2: UA10000B, KSM, urethane acrylate

A3: UA-2374P1B, Shin-Nakamura Chemical Co., Ltd., urethane acrylate

A4: UV-3524ACMO, Mitsubishi Chemical Co., Ltd., urethane acrylate

A5: UF-07DF, Kyoeisha Chemical Co., Ltd., of Osaka, Japan, urethane acrylate

Second (Meth)Acrylic Resin

B1: 4-HBA, Osaka Organic Chemical Industry Co., Ltd., 4-hydroxybutyl acrylate

B2: IDAA, Osaka Organic Chemical Industry Co., Ltd., isodecyl acrylate

B3: Viscoat#200, Osaka Organic Chemical Industry Co., Ltd., of Osaka City, Japan, cyclic trimethylolpropane formal acrylate B4: ISTA, Osaka Organic Chemical Industry Co., Ltd., of Osaka City, Japan, isostearyl acrylate B5: IBXA, Osaka Organic Chemical Industry Co., Ltd., isobornyl acrylate Referring to the results of Table 1, it is seen that the resin compositions of Examples 1 to 4 have a viscosity of about 20 mPa·s to about 25 mPa·s, a contact angle of about 10° to about 15°, and a coating property of about 5.1 mm to about 5.2 mm, and the adhesive member containing a polymer derived from the resin compositions of Examples 1 to 4 has a peel strength of about 1.2 kg/inch (2.54 cm) to about 2.0 kg/inch (2.54 cm).

In Comparative Examples 1 and 2, unlike Examples 1 to 4, the contact angles were 30° and 40°, and the viscosity values were 70 mPa·s and 140 mPa·s, including greater than 10 wt % of the first (meth)acrylate with respect to 100 wt % of the total amount of the resin composition. It is seen that in Comparative Examples 1 and 2, unlike Examples 1 and 4, the contact angle and viscosity had greater values.

Comparative Example 3, unlike Examples 1 to 4, included a resin having an average weight molecular weight of less than 10,000 as a first (meth)acrylic resin and a peel strength of an adhesive member of 0.5 kg/inch (2.54 cm), which fails to satisfy the acceptance criteria of "1 kg/inch (2.54 cm) or greater",for peel strength, and the acceptance criteria of "5.1 to 5.2",for coating properties.

Comparative Examples 4 and 5, unlike Examples 1 to 4, did not include at least two or more second (meth)acrylic resins, and the second (meth)acrylic resin used in Comparative Example 4 had a glass transition temperature of greater than −30°, and the weight average of the second (meth) acrylate resin in Comparative Example 5 was greater than 250. As a result, it is seen that the adhesive members containing polymers derived from the resin compositions of Comparative Examples 4 and 5 had peel strengths of 0.1 kg/inch (2.54 cm) and 0.3 kg/inch (2.54 cm), respectively, thus failing to satisfy the acceptance criteria of "1 kg/inch (2.54 cm) or greater".

Resins made according to the principles and exemplary embodiments of the invention and adhesive members including the same may have a first (meth)acrylic resin having a weight average molecular weight of about 10,000 to about 40,000, two or more second (meth)acrylic resins having a molecular weight of about 100 to about 250 and differing from one another, and two or more different photoinitiators, thereby providing for excellent smoothness and adhesion for various shapes.

Adhesive members made according to the principles and exemplary embodiments of the invention have excellent smoothness and adhesion, which may be provided by covering uneven or step portions of the surface of a display module, thereby providing for substantially uniform light transmittance to be displayed on substantially the entire display surface. Accordingly, display devices constructed according to the principles and exemplary embodiments of the invention have excellent optical properties even when an adhesive member is included.

Resin compositions made according to the principles and some exemplary embodiments of the invention may include an appropriate amount of a first (meth)acrylic resin having a high molecular weight and a second (meth)acrylic resin having a low molecular weight, and may thus exhibit excellent smoothness and shape applicability.

Adhesive members made according to the principles and some exemplary embodiments of the invention may be formed from a composition containing an appropriate amount of a first (meth)acrylic resin having a high molecular weight and a second (meth)acrylic resin having a low molecular weight, and may thus exhibit excellent adhesion and smoothness.

Some of the advantages that may be achieved by exemplary implementations of the invention include providing a display device having an adhesive member with excellent adhesion and smoothness, and may thus exhibit excellent optical properties.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A resin composition for use as an adhesive member in a display device, the resin composition consisting of:
    a first (meth)acrylic resin having a weight average molecular weight of about 10,000 to about 40,000 as a urethane acrylate;
    a second (meth)acrylic resin having a molecular weight of about 100 to about 250; and
    two or more different photoinitiators,
    wherein the second (meth)acrylic resin comprises:
        a first sub resin has a glass transition temperature of about −100° C. to about −30° C.; and
        a second sub resin differing from the first sub resin,
        wherein the first (meth)acrylic resin is included in an amount of about 2 wt % to about 10 wt % with respect to 100 wt % of the total amount of the first and second (meth)acrylic resins,
        wherein the first sub resin is included in an amount of about 60 wt % to about 80 wt % with respect to 100 wt % of the total amount of the first and second (meth)acrylic resins,
        wherein the second sub resin is included in an amount of about 20 wt % to about 40 wt % with respect to 100 wt % of the total amount of the first and second (meth)acrylic resins,
        wherein a weight ratio of the first (meth) acrylic resin to the second (meth) acrylic resin is 1:19 to 1:33, and
        wherein the first sub resin is 4-hydroxybutyl acrylate, and the second sub resin is isodecyl acrylate or isbornyl acrylate.

2. The resin composition of claim 1, wherein the first (meth)acrylic resin comprises urethane (meth)acrylate.

3. The resin composition of claim 1, wherein the photoinitiators comprise at least one of a self-cleavage polymerization initiator or a hydrogen drawing polymerization initiator.

4. The resin composition of claim 3, wherein the self-cleavage polymerization initiator comprises an acylphosphine oxide-based polymerization initiator.

5. The resin composition of claim 1, wherein the resin composition has a viscosity at 25° C. of about 20 mPa·s to about 25 mPa·s, as measured according to the procedure JIS Z8803 (2011).

6. The resin composition of claim 1, wherein the resin composition has a contact angle of about 10° to about 15° with respect to a slide glass.

7. An adhesive member for a display device, the adhesive member comprising a polymer made from a resin composition, consisting of:
    a first (meth)acrylic resin having a weight average molecular weight of about 10,000 to about 40,000 as a urethane acrylate;
    a second (meth)acrylic resin having a molecular weight of about 100; and
    two or more different photoinitiators,
    wherein the second (meth)acrylic resin comprises:
        a first sub resin has a glass transition temperature of about −100° C. to about −30° C.; and
        a second sub resin differing from the first sub resin,
        wherein the first (meth)acrylic resin is included in an amount of about 2 wt % to about 10 wt % with respect to 100 wt % of the total amount of the first and second (meth)acrylic resins,
        wherein the first sub resin is included in an amount of about 60 wt % to about 80 wt % with respect to 100 wt % of the total amount of the first and second (meth)acrylic resins,
        wherein the second sub resin is included in an amount of about 20 wt % to about 40 wt % with respect to 100 wt % of the total amount of the first and second (meth)acrylic resins,
    wherein a weight ratio of the first (meth) acrylic resin to the second (meth) acrylic resin is 1:19 to 1:33, and
    wherein the first sub resin is 4-hydroxybutyl acrylate, and the second sub resin is isodecyl acrylate or isbornyl acrylate.

8. The adhesive member of claim 7, wherein the first (meth)acrylic resin comprises urethane (meth)acrylate.

9. The adhesive member of claim 7, wherein the first sub resin comprises at least one of 4-hydroxybutyl acrylate or isodecyl acrylate, and wherein the second sub resin comprises at least one of isobornyl acrylate, (2-2-ethyl-1,3-dioxolan-4-yl)methyl acrylate, 6-hydroxyhexyl acrylate, or 10-hydroxydecyl acrylate.

10. The adhesive member of claim 7, wherein the photoinitiators comprise at least one of a self-cleavage polymerization initiator or a hydrogen drawing polymerization initiator.

11. The adhesive member of claim 10, wherein the self-cleavage polymerization initiator comprises an acylphosphine oxide-based polymerization initiator.

12. The adhesive member of claim 7, wherein the adhesive member has a peel strength of about 1.2 kg/inch to about 2.0 kg/inch with respect to glass.

13. A display device comprising:
    a display panel;
    a window disposed on the display panel; and
    an adhesive member disposed between the display panel and the window,
    wherein the adhesive member comprises a polymer made from a resin composition, and the resin composition consists of:
    a first (meth)acrylic resin having a weight average molecular weight of about 10,000 to about 40,000 as a urethane acrylate;
    a second (meth)acrylic resin having a molecular weight of about 100 to about 250; and
    two or more different photoinitiators,
    a second (meth)acrylic resin having a molecular weight of about 100 to about 250; and
    two or more different photoinitiators,
    wherein the second (meth)acrylic resin comprises:
        a first sub resin has a glass transition temperature of about −100° C. to about −30° C.; and
        a second sub resin differing from the first sub resin,
        wherein the first (meth)acrylic resin is included in an amount of about 2 wt % to about 10 wt % with respect to 100 wt % of the total amount of the first and second (meth)acrylic resins,
        wherein the first sub resin is included in an amount of about 60 wt % to about 80 wt % with respect to 100 wt % of the total amount of the first and second (meth)acrylic resins,
        wherein the second sub resin is included in an amount of about 20 wt % to about 40 wt % with respect to 100 wt % of the total amount of the first and second (meth)acrylic resins,
    wherein a weight ratio of the first (meth) acrylic resin to the second (meth) acrylic resin is 1:19 to 1:33, and
    wherein the first sub resin is 4-hydroxybutyl acrylate, and the second sub resin is isodecyl acrylate or isbornyl acrylate.

* * * * *